(12) United States Patent
Ito

(10) Patent No.: US 8,812,783 B2
(45) Date of Patent: Aug. 19, 2014

(54) OPERATION APPARATUS, CACHE APPARATUS, AND CONTROL METHOD THEREOF

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 13/105,062

(22) Filed: May 11, 2011

(65) Prior Publication Data

US 2011/0302373 A1 Dec. 8, 2011

(30) Foreign Application Priority Data

Jun. 7, 2010 (JP) .................................. 2010-130447

(51) Int. Cl.
*G06F 12/08* (2006.01)

(52) U.S. Cl.
CPC .................................. *G06F 12/0802* (2013.01)
USPC .......................................... 711/118; 711/128

(58) Field of Classification Search
CPC .................................................. G06F 12/0855
USPC .......................................... 711/140, 118, 128
See application file for complete search history.

(56) References Cited

U.S. PATENT DOCUMENTS

| | | | | |
|---|---|---|---|---|
| 5,163,142 A | * | 11/1992 | Mageau | 711/142 |
| 5,353,424 A | * | 10/1994 | Partovi et al. | 711/128 |
| 5,386,527 A | * | 1/1995 | Bosshart | 711/3 |
| 5,572,690 A | * | 11/1996 | Molnar et al. | 712/200 |
| 5,710,905 A | * | 1/1998 | Wan | 711/118 |
| 5,748,539 A | * | 5/1998 | Sproull et al. | 365/189.04 |
| 5,829,024 A | * | 10/1998 | Sato | 711/122 |
| 5,845,309 A | | 12/1998 | Shirotori et al. | 711/3 |
| 5,905,680 A | * | 5/1999 | Bosshart | 365/189.07 |
| 6,754,772 B2 | * | 6/2004 | Crook et al. | 711/118 |

(Continued)

FOREIGN PATENT DOCUMENTS

| | | |
|---|---|---|
| CN | 1431599 A | 7/2003 |
| EP | 0650117 | 4/1995 |

(Continued)

OTHER PUBLICATIONS

Foster et al., "Design of Special-Purpose VLSI Chips: Example and Opinions", *IP.com Journal*, IP.com Inc., No. IPCOM000148069D, pp. 1-26 (Mar. 28, 2007), XP013119002.

(Continued)

*Primary Examiner* — Charles Rones
*Assistant Examiner* — Andrew Russell
(74) *Attorney, Agent, or Firm* — Fitzpatrick, Cella, Harper & Scinto

(57) ABSTRACT

An apparatus comprising first holding units each of which includes first nodes connected in series and shifts first data in each first node in a first direction, second holding units each of which includes second nodes connected in series and shifts second data in each second node in a second direction is provided. Each first node corresponds to at least one of the second nodes. The apparatus further comprises an operation unit which executes, for a node of interest which is a first node, an operation using first data in the node of interest, and second data in at least one of the second nodes to which the node of interest corresponds, and an input unit which inputs, in parallel, the first data to at least two out of the first holding units, and serially inputs the second data to at least two out of the second holding units.

16 Claims, 11 Drawing Sheets

(56) References Cited

U.S. PATENT DOCUMENTS

| | | | |
|---|---|---|---|
| 7,205,994 B2 * | 4/2007 | Fu et al. | 345/557 |
| 7,502,887 B2 * | 3/2009 | Tanaka et al. | 711/128 |
| 7,546,405 B2 * | 6/2009 | Terakawa | 710/241 |
| 7,689,772 B2 * | 3/2010 | Damaraju et al. | 711/128 |
| 7,913,007 B2 * | 3/2011 | Singh et al. | 710/105 |
| 2003/0079115 A1 | 4/2003 | Henry et al. | 712/217 |
| 2009/0100054 A1 * | 4/2009 | Croxford et al. | 707/6 |
| 2010/0088550 A1 * | 4/2010 | Imai et al. | 714/42 |
| 2010/0106910 A1 * | 4/2010 | Miwa | 711/118 |
| 2010/0122012 A1 * | 5/2010 | Gebara et al. | 711/3 |
| 2010/0122031 A1 * | 5/2010 | Strumpen et al. | 711/122 |
| 2010/0185904 A1 * | 7/2010 | Chen | 714/54 |
| 2010/0299498 A1 * | 11/2010 | Ito | 712/200 |
| 2012/0030453 A1 * | 2/2012 | Ito | 712/233 |

FOREIGN PATENT DOCUMENTS

| | | |
|---|---|---|
| JP | 07-253885 | 10/1995 |
| JP | 10-190744 A | 7/1998 |
| JP | 11-102589 A | 4/1999 |
| JP | 2001-514780 A | 9/2001 |
| JP | 3588487 | 11/2004 |

OTHER PUBLICATIONS

Extended European Search Report dated Aug. 29, 2011, issued in counterpart European Patent Application No. 11164892.9.

* cited by examiner

FIG. 7

<FORMAT>

| PROCESSING APPARATUS IDENTIFICATION SIGNAL ID | PARTITION INFORMATION [N BITS] |
|---|---|
| 1 | 110···100 |
| 2 | 000···001 |
| 3 | 001···010 |
| ⋮ | ⋮ |
| M | 000···000 |

OPERATION APPARATUS, CACHE APPARATUS, AND CONTROL METHOD THEREOF

BACKGROUND OF THE INVENTION

1. Field of the Invention

The present invention relates to an operation apparatus, a cache apparatus, and a control method thereof.

2. Description of the Related Art

There are many applications which request to determine whether or not each individual data included in a first data group matches at least some data in a second data group. Japanese Patent No. 3588487 proposes a counterflow pipeline technique so as to attain such determination. The counterflow pipeline technique will be described below with reference to FIG. 11. The counterflow pipeline technique uses first and second pipelines 1110 and 1120 as two pipelines. The first pipeline 1110 has a plurality of first nodes 1111, and these first nodes 1111 store data A[0] to A[3] of a first data group at a certain timing. The first pipeline 1110 shifts data in the right direction. As a result of the data shift, for example, the first node 1111 which stored data A[2] stores data A[3]. The second pipeline 1120 has a plurality of nodes 1121, and these second nodes 1121 store data B[0] to B[3] of a second data group at a certain timing. The second pipeline 1120 shifts data in the left direction. Determination units 1130 are connected to the first and second nodes 1111 and 1121, and determine whether or not data stored in these nodes match. With the counterflow pipeline technique, since data in the two pipelines are shifted in the opposing directions, data of the first and second groups are compared by a round-robin method.

In order to attain faster counterflow pipeline operations, the two pipelines are independently shifted. However, when the first and second pipelines 1110 and 1120 are shifted at the same time, some data may not be compared. For example, at a timing shown in FIG. 11, data A[2] and B[1] are compared. When the first and second pipelines are shifted at the same time, data A[2] is compared with data B[3] at the next timing. Therefore, data A[2] is never compared with data B[2]. In order to suppress such data comparison errors, in Japanese Patent No. 3588487, the statuses of nodes of the first and second pipelines 1110 and 1120 are monitored. In a status in which a data comparison error will occur, the two pipelines are stalled, and are allowed to shift data after completion of comparison. Furthermore, in the counterflow pipeline technique described in Japanese Patent No. 3588487, data undergo only one-to-one comparison processes, but one data cannot be simultaneously compared with a plurality of data or the number of data to be simultaneously compared with one data cannot be dynamically changed.

SUMMARY OF THE INVENTION

As described above, it is difficult for the counterflow pipeline technique described in Japanese Patent No. 3588487 to surely and flexibly compare data. Hence, one aspect of the present invention provides a technique for surely and flexibly comparing data using counterflow pipelines.

An aspect of the present invention provides an operation apparatus comprising: a plurality of first holding units each of which includes a plurality of first nodes connected in series and shifts first data held in each first node to a neighboring node located in a first direction; a plurality of second holding units each of which includes a plurality of second nodes connected in series and shifts second data held in each second node to a neighboring node located in a second direction, wherein each first node corresponds to at least one of the plurality of second nodes; an operation unit which executes, for a node of interest which is one of the plurality of the first nodes of the first holding unit, an operation using first data held in the node of interest, and second data held in at least one of the plurality of second nodes to which the node of interest corresponds; and an input unit which inputs, in parallel, the first data to at least two out of the plurality of first holding units, and serially inputs the second data to at least two out of the plurality of second holding units.

Another aspect of the present invention provides a cache apparatus comprising a plurality of data processing apparatuses, each of the plurality of data processing apparatuses including: a first pipeline which includes a plurality of first nodes and shifts an address held in one first node to another first node located in a first direction with respect to the one first node; a second pipeline which includes a plurality of second nodes and shifts a cache tag held in one second node to another second node located in a second direction opposite to the first direction with respect to the one second node, wherein each first node corresponds to at least one of the plurality of second nodes; and a comparison unit which compares, for a node of interest which is one of the plurality of the first nodes of the first pipeline, an address held in the node of interest with a cache tag held in at least one of second nodes to which the node of interest corresponds to determine whether or not the address matches the cache tag; the cache apparatus further comprising: a cache memory which stores some of data stored in an external storage device; an acquisition unit which acquires a request of data from a processing apparatus; a first input unit which replicates an address of the acquired data and inputs the replicated address to the first pipelines of the plurality of data processing apparatuses; a second input unit which inputs a cache tag of data stored in the cache memory to the second pipeline of one of the plurality of data processing apparatuses; and a determination unit which determines, when it is determined that a comparison result of the comparison unit indicates a match, a cache hit of the acquired data, wherein the second pipelines of the plurality of data processing apparatuses are connected in series.

Further features of the present invention will become apparent from the following description of exemplary embodiments (with reference to the attached drawings).

BRIEF DESCRIPTION OF THE DRAWINGS

FIG. 7 shows an exemplary format of a partition information table;

DESCRIPTION OF THE EMBODIMENTS

Embodiments of the present invention will be described hereinafter with reference to the accompanying drawings.

[Image Processing Apparatus 100]

Figure 1:
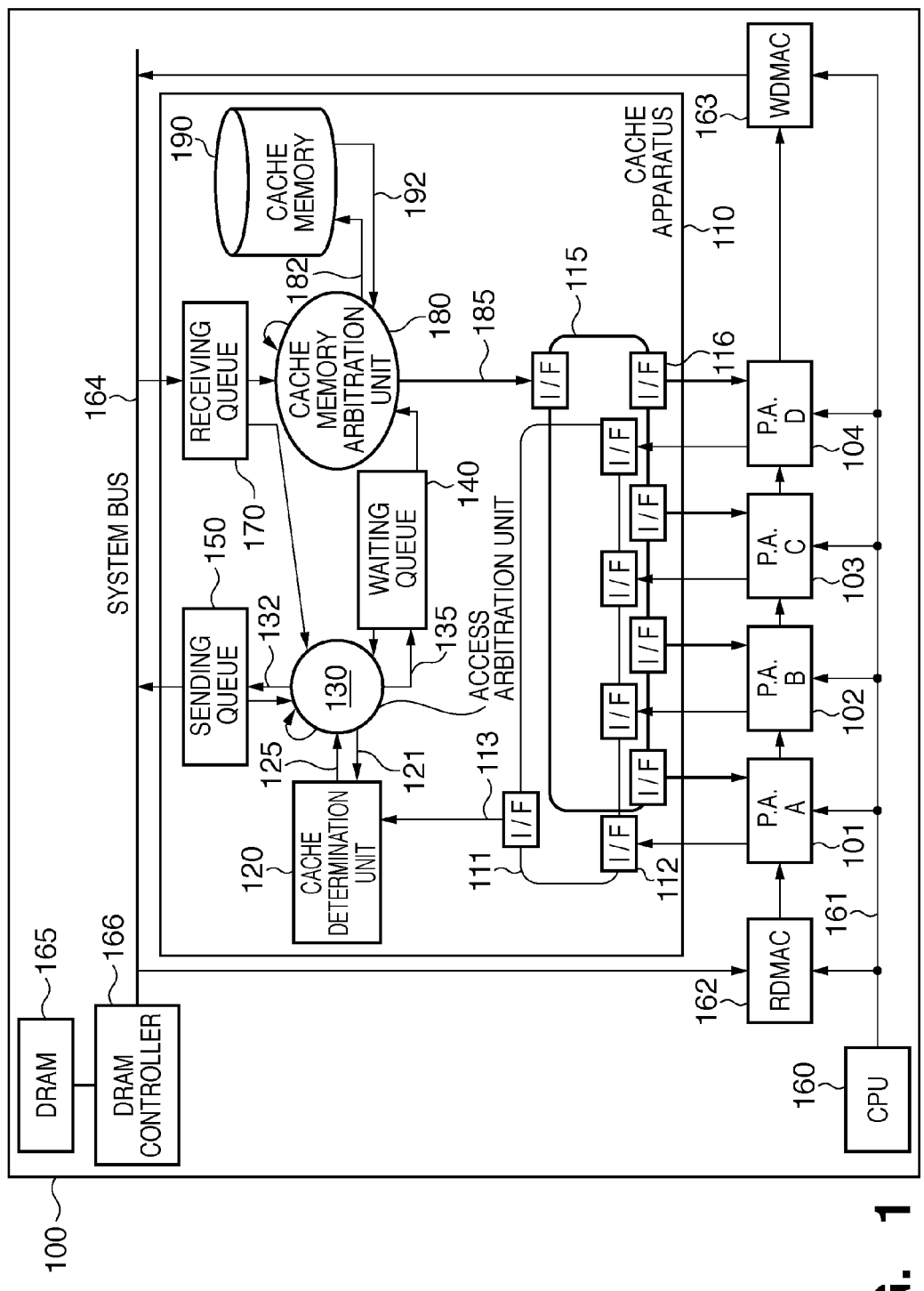
FIG. 1 is an exemplary overall block diagram showing the basic arrangement of an image processing apparatus 100.

FIG. 1 is an exemplary block diagram showing an example of the overall arrangement of an image processing apparatus 100 including a cache apparatus 110. In the cache apparatus 110, a data processing apparatus (to be described later) is applied as a fully-associative cache determination unit 120.

The image processing apparatus 100 includes a CPU 160, a DRAM 165 as an external storage device, a DRAM controller 166, and a system bus 164. The image processing apparatus 100 also includes an RDMAC 162 as a DMAC (Direct Memory Access Controller) used to read out data, and a WDMAC 163 used to write data, so as to read/write data from/to the DRAM 165. The image processing apparatus 100 further includes processing apparatuses (P.A.) A 101 to D 104 which execute processing such as image processing, and a cache apparatus 110. The plurality of processing apparatuses share the cache apparatus 110. That is, the cache apparatus 110 is a shared cache apparatus. The image processing apparatus 100 can include an arbitrary number of processing apparatuses, each of which may be configured by a pipeline circuit that executes fast permanent processing, or by a processor and programs that can flexibly change processing content although the processing speed is low.

The CPU 160 controls the RDMAC 162, WDMAC 163, and processing apparatuses A 101 to D 104 via a control bus 161, thereby systematically controlling the overall image processing apparatus 100. The RDMAC 162 reads out image data stored in the DRAM 165 via the system bus 164 and DRAM controller 166, and inputs the readout image data to the processing apparatus A 101 in accordance with an instruction from the CPU 160. The processing apparatus A 101 executes desired image processing, and outputs image data as a processing result to the processing apparatus B 102. The processing apparatuses B 102, C 103, and D 104 similarly execute various kinds of image processing as in the processing apparatus A 101, and output image data as a processing result to the subsequent processing apparatuses. The processing apparatus D 104 outputs image data as a processing result to the WDMAC 163. The WDMAC 163 stores the image data received from the processing apparatus D 104 in the DRAM 165 via the system bus 164 and DRAM controller 166 in accordance with an instruction from the CPU 160. The image processing apparatus 100 carries out the image processing by executing the aforementioned series of operations.

During the aforementioned image processing, the processing apparatuses A 101 to D 104 can read out various required data (settings, a table, attribute information, etc.) from the DRAM 165 via the shared cache apparatus 110, and can use the readout data in the image processing. When any of the processing apparatuses is configured by a processor and programs, the programs may be sequentially read out via the cache apparatus 110 to implement processing.

[Cache Apparatus 110]

The arrangement and operation of the cache apparatus 110 will be described in detail below. The aforementioned processing apparatuses A 101 to D 104 output storage addresses of data on the DRAM 165 to I/Fs 112 when they read out the data from the DRAM 165 via the cache apparatus 110. The cache apparatus 110 includes a ring bus 111 used for an access request, so as to transfer storage addresses of data on the DRAM 165. The I/Fs 112 corresponding to the respective processing apparatuses are connected to each other via this ring bus 111. Storage addresses 113 output from the respective processing apparatuses are input to the cache determination unit 120 via the I/Fs 112 and ring bus 111. The cache determination unit 120 determines a cache hit or miss based on the input storage addresses 113.

[Cache Determination Unit 120]

Figure 2:
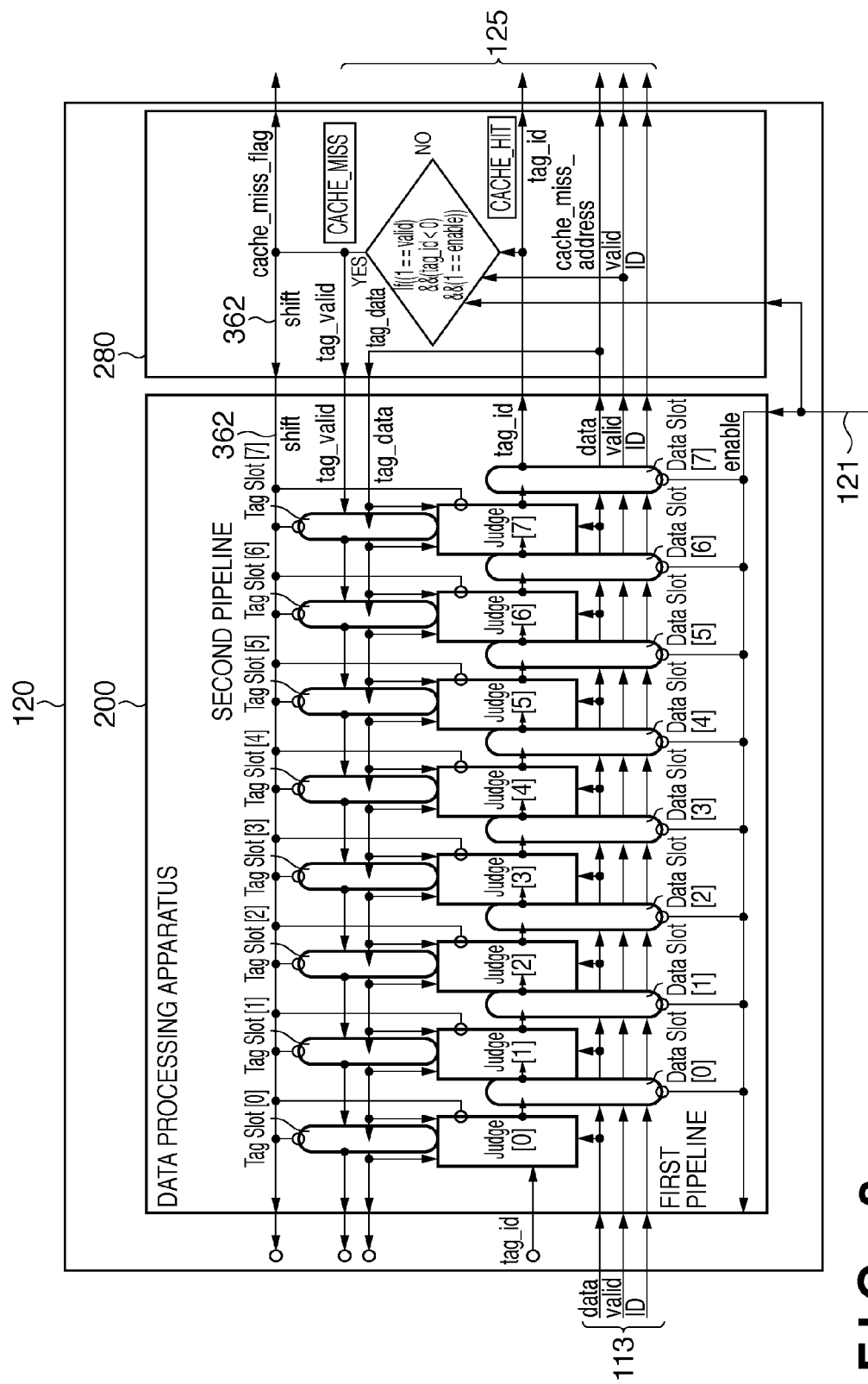
FIG. 2 is an exemplary circuit diagram showing the basic arrangement of a cache determination unit 120.

An example of the circuit arrangement of the cache determination unit 120 will be described in detail below with reference to FIG. 2. The cache determination unit 120 includes a data processing apparatus 200 and cache determination apparatus 280.

The storage address 113 to be input to the cache determination unit 120 (first inputs) includes:
- an address validity signal "valid";
- an address signal "data"; and
- an identification signal "ID" of each of the processing apparatuses 101 to 104.

These signals are input to the data processing apparatus 200.

[Data Processing Apparatus 200]

Figure 3:
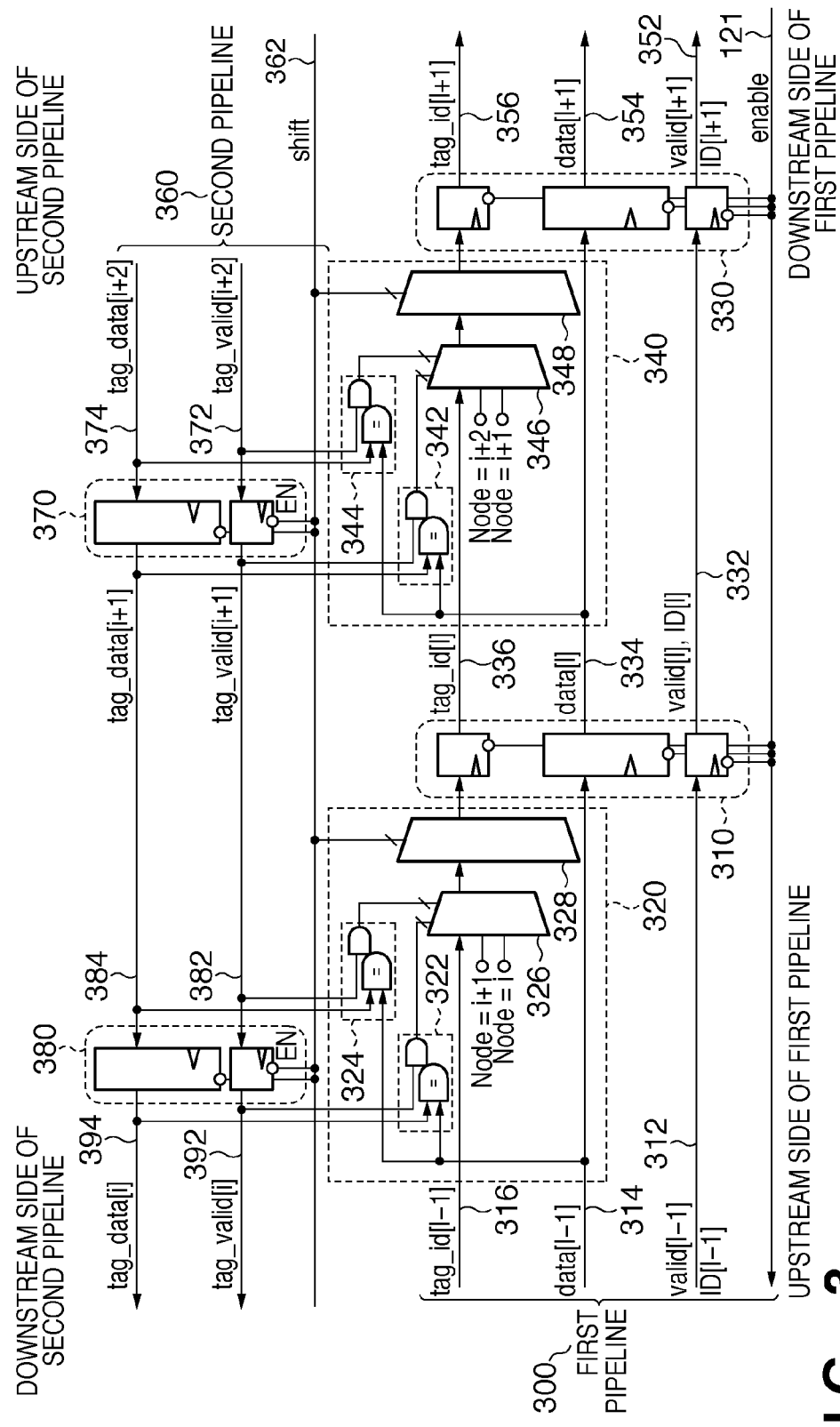
FIG. 3 is an exemplary circuit diagram showing the basic arrangement of a data processing apparatus 200.

An example of the circuit arrangement of the data processing apparatus 200 will be described in detail below with reference to FIG. 3. FIG. 3 is a diagram focusing on a part of the data processing apparatus 200. A first pipeline 300 has a plurality of nodes (first nodes). If one of these nodes is selected as a node of interest (for example, a node 310), data elements (first data) are shifted from the node of interest to a next first node on the downstream side (for example, a node 330) in a first direction (a right direction in FIG. 1). As shown in FIG. 2, the first pipeline 300 receives, from outside the data processing apparatus 200:
- an address validity signal "valid";
- an address signal "data";
- a processing result signal "tag_id" as a processing result of the address signal; and
- an identification signal "ID" of the processing apparatus.

The signals "valid", "data", and "ID" are included in the storage address 113, and the signal "tag_id" is, for example, a default value.

Referring back to FIG. 3, for example, the node 310 receives:
- an address validity signal "valid[1−1]" 312;
- an address signal "data[1−1]" 314; and
- an identification signal "ID[1−1]" of each processing apparatus.

In FIG. 3, the signals "valid" and "ID" are expressed by one signal line for the sake of simplicity. Also, a data processing circuit 320 receives:
- the address signal "data[1−1] 314; and
- a processing result signal "tag_id[1−1]" 316 as a processing result of the address signal.

The data processing circuit 320 applies processing to be described later to these input signals, and outputs a processing result to the node 310.

When a signal "enable" 121 as a driving signal is valid (asserted), the node 310 including a pipeline register updates data elements stored so far using data elements input from a node on the upstream side and the data processing circuit 320. On the other hand, when the signal "enable" 121 is invalid (deasserted), the node 310 ignores data elements input from the upstream side, holds stored data elements intact, and does not update the data elements. For the sake of descriptive convenience, of the first pipeline 300, a section including one node and a data processing circuit which inputs a processing result signal to that node will be referred to as a stage. Especially, in FIG. 3, a section including the node 310 and data processing circuit 320 will be referred to as a first stage.

The node 310 outputs, to the node 330 and a data processing circuit 340 on the downstream side, stored data, that is:
an address validity signal "valid[l]" 332;
an address signal "data[l]" 334;
a processing result signal "tag_id[l]" 336; and
an identification signal "ID[l]".

In FIG. 3, of the first pipeline 300, a section including the node 330 and data processing circuit 340 will be referred to as a second stage. As in the first stage, various kinds of data processing are executed in the second stage. Data elements after the processing are temporarily stored in the node 330. This storage operation is the same as that in the first stage.

Furthermore, the node 330 outputs:
an address validity signal "valid[l+1]" 352;
an address signal "data[l+1]" 354;
a processing result signal "tag_id[l+1]" 356; and
an identification signal "ID[l+1]".

With this operation, in the first pipeline 300, data elements (the validity signal "valid", address signal "data", processing result signal "tag_id", and identification signal "ID") are shifted from the left side on the plane of drawing as the "upstream side" to the right side on the plane of drawing as the "downstream side".

The data processing apparatus 200 includes a second pipeline 360 in addition to the first pipeline 300. This second pipeline 360 has a plurality of nodes (second nodes), and shifts data elements held in pipeline registers in these second nodes to neighboring nodes located in the direction (second direction) opposite to the first pipeline. More specifically, the second pipeline 360 shifts data elements from the right side on the plane of drawing as the "upstream side" to the left side on the plane of drawing as the "downstream side". As shown in FIG. 2, the second pipeline 360 receives an address validity signal "tag_valid" and an address signal "tag_data" from outside the data processing apparatus 200 (second inputs).

Referring back to FIG. 3, a node 370 receives, from the upstream side, an address validity signal "tag_valid[i+2]" 372, and an address signal "tag_data[i+2]" 374. These input signals are used in the aforementioned data processing circuit 340.

When a driving signal "shift" 362 is valid (asserted), the node 370 updates data elements stored so far using data elements input from the node on the upstream side. On the other hand, when the driving signal "shift" 362 is invalid (deasserted), the node 370 ignores data elements input from the upstream side, holds stored data elements intact, and does not update the data elements. Of the second pipeline 360, a section including one node will be referred to as a stage. Especially, in FIG. 3, a section including the node 370 will be referred to as a first stage.

The node 370 outputs an address validity signal "tag_valid [i+1]" 382 and address signal "tag_data[i+1]" 384 stored in a pipeline register to a node 380 and the data processing circuits 320 and 340. Furthermore, the node 380 outputs a validity signal "tag_valid[i]" 392 and address signal "tag_data[i]" 394 to the downstream side. With this operation, in the second pipeline 360, the validity signal "tag_valid" and address signal "tag_data" as data elements are shifted from the right side on the plane of drawing as the "upstream side" to the left side on the plane of drawing as the "downstream side".

[Data Processing Circuit]

The data processing circuits 320 and 340 will be described in detail below. The data processing circuit compares address signals "data" and "tag_data" in two directions (first comparison). When these signals are equal to each other, the data processing circuit stores a storage index ("[i]", "[i+1]", or "[i+2]" described above) of the signal "tag_data" as a signal "tag_id". Then, the signal "tag_id" is shifted as a data processing result of the first pipeline 300 from the left side on the plane of drawing as the "upstream side" to the right side on the plane of drawing as the "downstream side" in synchronism with "data". In this manner, in the signal "tag_id[l]" 336, a storage index of a data element of the second pipeline 360, which has a value equal to that of the l-th data element "data[l]" 334 of the first pipeline 300, is set.

More specifically, when the validity signal "tag_valid[i]" 392 is valid, the data processing circuit 320 controls a comparison circuit 322 to compare the address signals "data[l−1]" 314 and "tag_data[i]" 394. When these signals are equal to each other as a comparison result, a selector 326 selects a storage index "Node=i" of the signal "tag_data[i]" 394. This selected value is set in the signal "tag_id[l−1]" 316 as a storage index of a data element of the second pipeline 360, which has a value equal to that of the signal "data[l−1]" 314 of the first pipeline 300.

As described above, when the first and second pipelines 300 and 360 operate at the same time, a comparison error may occur in some cases. In order to avoid such error, when the validity signal "tag_valid[i+1]" 382 is valid, the data processing circuit 320 controls a comparison circuit 324 to compare the address signal "data[l−1]" 314 and "tag_data[i+1]" 384 (second comparison). When these signals are equal to each other as a comparison result, the selector 326 preferentially selects a storage index "Node=i+1" of the signal "tag_data [i+1]" 384.

When the two pairs of compared signals are not equal to each other as the two comparison results, the selector 326 selects the input processing result signal "tag_id[l−1]" 316. When the driving signal "shift" 362 is valid (asserted), and the second pipeline 360 operates, data elements of the second pipeline 360 are shifted to the left side on the plane of drawing as the "downstream side". Therefore, in this case, the storage index of each signal "tag_data" indicates the left neighboring storage index. Thus, the storage index is adjusted by decrementing the selection result of the selector 326 by "1" using a decrementer (subtractor) 328.

The storage index selection method will be supplemented below. One of the storage indices "Node=i", "Node=i+1", and "tag_id[l−1]" 316 is selected. The criterion of selecting the storage index can be a simple one, for example, "preferentially selecting a storage index having a larger value". For example, a case will be examined below wherein the data signals "data[l−1]" 314 and "tag_data[i+1]" 384 are equal to each other, and the driving signal "shift" 362 is valid. In this case, in order to avoid the aforementioned comparison error, it is important to select "Node=i+1", and this operation matches a method "preferentially selecting a storage index having a larger value". On the other hand, when the driving signal "shift" 362 is invalid, the aforementioned comparison error need not be avoided, and "Node=i+1" need not be selected. However, irrespective of selection/non-selection of "Node=i+1", the second stage as a downstream stage of the first pipeline 300 evaluates comparison between the address signals "data[l]" 334 and "tag_data[i+1]" 384 once again. For this reason, when the driving signal "shift" 362 is invalid, comparison with the signal "tag_data[i+1]" 384 in the first stage may or may not be made. Conversely, selection by the method "preferentially selecting a storage index having a larger value" may be made. The value selected in this manner is set in the signal "tag_id[l−1]" 316 indicating a storage index of a data element of the second pipeline 360, which has a value equal to that of the signal "data[l−1]" 314.

The example which has been explained with reference to FIG. 3 is presented only for exemplary purposes. For example, the driving signal "shift" 362 may be substituted in the selector 326 to control not to select "Node=i+1" when the driving signal "shift" 362 is invalid. When the comparison results of both the comparison circuits 322 and 324 are <false>, the input data signal "tag_id[1−1]" 316 is selected. In any case, adjustment to decrement the storage index by "1" is executed to cope with the shift of the storage location to the "downstream side" when the driving signal "shift" 362 is valid. For this reason, control not to select "Node=i+1" is not executed, and adjustment to decrement the storage index by "1" is executed again after "Node=i+1" is selected.

The same applies to the data processing circuit 340. When the validity signal "tag_valid[i+1]" 382 is valid, a comparison circuit 342 compares the address signals "data[l]" 334 and "tag_data[i+1]" 384. When the two signals are equal to each other as a comparison result, a selector 346 selects a storage index "Node=i+1" of the signal "tag_data[i+1]" 384. To prepare for the operation of the second pipeline 360, the data processing circuit 340 controls a comparison circuit 344 to compare the data signals "data[l]" 334 and "tag_data[i+2]" 374 when the validity signal "tag_valid[i+2]" 372 is valid. When these signals are equal to each other as a comparison result, the selector 346 preferentially selects a storage index "Node=i+2" of the signal "tag_data[i+2]" 374. When the two pairs of compared signals are not equal to each other as the two comparison results, the selector 346 selects the processing result signal "tag_id[l]" 336. When the driving signal "shift" 362 is valid, and the second pipeline 360 operates accordingly, the storage index of the signal "tag_data" is shifted by "1" to the left side on the plane of drawing as the "downstream side". For this reason, the storage index is decremented by "1" using a decrementer (subtracter) 348 from the selection result of the selector 346. In this way, the match detection result can be adjusted, and more accurate and faster data processing can be implemented by simple processing. As described above, the data processing apparatus 200 can surely and quickly compare data elements, which are shifted in the opposing directions, in the respective stages of the pipelines.

Each of the aforementioned data processing circuits 320 and 340 has a comparison circuit with a data element to be compared in the second pipeline 360 per data element of the first pipeline 300. Furthermore, each of the data processing circuits 320 and 340 has a new comparison circuit with an "upstream" data element of the second pipeline 360 for a data element to be compared of the second pipeline 360 under the assumption of the operation of the second pipeline 360. Since these circuits can avoid a problem of interlocking (internal stalling) for each specific stage, which may occur in the arrangement of Japanese Patent No. 3588487, high processing performance can always be attained without stalling the data processing.

In the data processing apparatus 200, in order to calculate the storage location when the two data elements are equal to each other, each of the data processing circuits 320 and 340 includes the decrementer for decrementing the processing result by "1" under the assumption of the operation of the second pipeline 360. Then, the storage indices of data elements of the second pipeline are assigned in advance to increase like "0, 1, 2, . . . , i, i+1, i+2, . . . , N−1 (i and N are positive values, i<N)" from the "downstream side" toward the "upstream side" of the second pipeline. The advantage of such assignment will be described later. When the storage indices are assigned in a reverse order, the decrementer naturally serves as an incrementer used to increment the storage index by "1".

The arrangement of the data processing apparatus 200 will be described below with reference to FIG. 2 again. In the data processing apparatus 200, both the first and second pipelines 300 and 360 include eight stages. Data Slot[0] to Data Slot[7] in FIG. 2 correspond to the nodes 310 and 330 of the first pipeline 300 shown in FIG. 3. Tag Slot[0] to Tag Slot[7] in FIG. 2 correspond to the nodes 370 and 380 of the second pipeline 360 shown in FIG. 3. Judge[0] to Judge[7] correspond to the data processing circuits 320 and 340 shown in FIG. 3. As described above, by providing a plurality of stages, the data processing apparatus 200 can distribute in parallel and compare many data elements by pipeline operations.

The storage address 113 is shifted by the Data Slots of the first pipeline 300 of the data processing apparatus 200. The data processing apparatus 200 can simultaneously store eight signals "data_tag", and cache tag information is stored in each of these eight signals "tag_data". A cache apparatus using an example of the data processing apparatus 200 corresponds to an 8-node, fully-associative cache apparatus. Also, the 0th to 7th storage locations are set in series in turn from the "downstream side" of the second pipeline 360, and the second pipeline 360 has a shift structure which shifts data elements to the "downstream side" when the driving signal "shift" 362 is valid (asserted). With this shift structure, an oldest cache tag is stored in the signal "tag_data" at the 0th storage location, and a newest cache tag is stored in the signal "tag_data" at the 7th storage location. Every time a cache miss occurs, the cache tags are shifted in turn from the signal "tag_data" at the 7th storage location to that at the 0th storage location, and are then swept out from the second pipeline 360. The cache determination unit 120 always discards cache tag and cache data in turn from the oldest ones although it has a very simple structure. As a result, complicated replace control of a general cache mechanism need not be executed.

[Cache Hit Determination]

The cache hit determination sequence will be described below. The "cache hit determination" is to determine whether or not data designated by the storage address 113 is stored in a cache memory 190. When the designated data is stored in the cache memory 190, a cache hit is determined; otherwise, a cache miss is determined. The cache hit determination is made by the cache determination apparatus 280. The cache determination apparatus 280 determines a cache hit or miss by checking a sign bit having a 1-bit length of the processing result signal "tag_id" (2's complement representation) output from the data processing apparatus 200. When the validity signal "valid" as the output from the data processing apparatus 200 is valid (asserted), and its sign bit is "1", the signal "tag_id" assumes a negative value, and the cache determination apparatus 280 determines a cache miss. When the validity signal "valid" is valid (asserted), and its sign bit is "0", the signal "tag_id" assumes a non-negative value, and the cache determination apparatus 280 determines a cache hit. When the validity signal "valid" is invalid (deasserted), the cache determination apparatus 280 skips determination. Also, when a signal "enable" from an access arbitration unit 130 is invalid (deasserted), the cache determination apparatus 280 skips determination.

The address signal "data", validity signal "valid", and identification signal "ID" as the outputs of the data processing apparatus 200 are input to the cache determination apparatus 280 in synchronism with the signal "tag_id". When a cache miss is determined by the above processing, this address signal "data" is output from the cache determination apparatus 280 as an address "cache miss address" at the time of a cache miss. In case of the cache miss, the cache determination apparatus 280 validates (asserts) the driving signal "shift"

362, and outputs the address "cache_miss_address" at the time of a cache miss as the cache tag "tag_data". Every time a cache miss is determined, the driving signal "shift" 362 is validated, and the processing result "tag_id" is decremented, as described above.

Even when the processing result "tag_id" holds a positive value initially, if a cache miss is repeated, the second pipeline 360 is shifted, and the cache tag "tag_data" is often swept out from the second pipeline 360. As can be seen from the above description, the swept-out processing result "tag_id" assumes a negative value since the storage index of the oldest cache tag is zero. This is why the sign of the signal "tag_id" need only be checked in the aforementioned cache determination. That is, the method of assigning the numbers of the storage locations is devised so that the oldest cache tag corresponds to 0th and the newest cache tag corresponds to (N−1)th. As a result, the cache hit determination can be attained by determining the sign of the data processing result in the last stage of the first pipeline 300. Therefore, the cache determination can be done very simply. When the storage indices are assigned from 0th to (N−1)th from the "upstream side" toward the "downstream side" of the second pipeline 360, the cache hit determination can be attained by checking whether or not the value of the signal "tag_id" is smaller than N as the number of elements of the second pipeline.

For the mechanism which always discards cache data in turn from oldest cache data, as described above, the cache memory 190 can use a ring type FIFO. In this case, the cache determination unit 120 and cache memory 190 can be easily synchronized. Note that when the cache determination indicates a cache hit, desired cache data is stored in the cache memory at a position indicated by "tag_id".

With the aforementioned processing, the cache determination unit 120 outputs, to the access arbitration unit 130, as a determination result 125 based on the input storage address 113:

the address validity signal "valid",
the address signal "cache_miss_address" as a data storage address of the DRAM 165 at the time of a cache miss,
the identification signal "ID" of the processing apparatus;
the signal "tag_id" as a storage address of cache data, and
a cache determination result "cache_miss_flag".

[Access Arbitration Unit 130]

The operation of the access arbitration unit 130 will be described below with reference to FIG. 1. When the validity signal "valid" in the determination result 125 is valid (asserted), the access arbitration unit 130 operates; otherwise, it waits. The access arbitration unit 130 executes the following processing according to a valid (asserted)/invalid (deasserted) status of the cache determination result "cache_miss_flag" in the determination result 125.

When the cache determination result "cache_miss_flag" is valid, the access arbitration unit 130 evaluates empty statuses of respective storage areas of a sending queue 150, receiving queue 170, and waiting queue 140. When all of the three queues have empty areas, the access arbitration unit 130 enqueues signals "ID, tag_id, cache_ miss_flag" 135 in the waiting queue 140. At the same time, the access arbitration unit 130 enqueues an address signal "cache_miss_address" 132 in the sending queue 150. If no empty areas are available, the access arbitration unit 130 invalidates (deasserts) the driving signal "enable" 121 to stall the cache determination unit 120, and waits until the storage areas become empty.

When the cache determination result "cache_miss_flag" is invalid, the access arbitration unit 130 evaluates an empty status of the waiting queue 140. If an empty area is available, the access arbitration unit 130 enqueues the signal "ID, tag_id, cache_miss_flag" 135 in the waiting queue 140. If no empty area is available, the access arbitration unit 130 invalidates (deasserts) the driving signal "enable" 121 to stall the cache determination unit 120, and waits until the storage areas become empty.

[Cache Memory Arbitration Unit 180]

The operation of a cache memory arbitration unit 180 will be described below. The cache memory arbitration unit 180 evaluates whether or not data are held in the storage areas of the receiving queue 170 and waiting queue 140. The cache memory arbitration unit 180 dequeues the cache determination result "ID, tag_id, cache_miss_flag" to be processed from the waiting queue 140. When the waiting queue 140 is empty, since there is no cache determination result to be processed, the cache memory arbitration unit 180 waits without any processing. Next, the cache memory arbitration unit 180 executes the following processing depending on whether the cache determination result "cache_miss_flag" is invalid (deasserted) or valid (asserted).

When the cache determination result "cache_miss_flag" is invalid (deasserted), this means a cache hit. Hence, the cache memory arbitration unit 180 calculates a storage address in the cache memory 190 based on "tag_id" in the data elements dequeued from the waiting queue 140, and a write pointer of the FIFO cache memory 190. The cache memory arbitration unit 180 reads out cached data based on that storage address from the cache memory 190 as data "read_data" 192. Then, the cache memory arbitration unit 180 outputs cache data "valid, ID, cache_ data" 185 to I/Fs 116.

When the cache determination result "cache_miss_flag" is valid (asserted), this means a cache miss. The cache memory arbitration unit 180 confirms if data which is not stored in the cache memory 190 is received from the DRAM 165 in the receiving queue 170. If no data is received, the cache memory arbitration unit 180 waits until data is received. If data is received, the cache memory arbitration unit 180 dequeues cache data to be updated from the receiving queue 170. Then, the cache memory arbitration unit 180 writes the dequeued data in a storage area of the cache memory 190 indicated by a write pointer as data "write_data" 182. At the same time, the cache memory arbitration unit 180 outputs cache data "valid, ID, cache_data" 185 to the I/Fs 116. Next, the cache memory arbitration unit 180 increments the write pointer of the cache memory 190. When the FIFO capacity is exceeded, the cache memory arbitration unit 180 resets the write pointer to zero.

The cache apparatus 110 distributes cache data obtained by the aforementioned process to the processing apparatuses 101 to 104. The cache apparatus 110 includes a ring bus 115 used to distribute cache data. The I/Fs 116 corresponding to these processing apparatuses are connected to each other via this ring bus 115. Each of the I/Fs 116 connected to the respective processing apparatuses receives the cache data "valid, ID, cache_data" 185 as the output from the cache memory arbitration unit 180. Then, when the identification signal "ID" of the received cache data matches that of the connected processing apparatus, the corresponding I/F 116 outputs the cache data to the processing apparatus. If the two identification signals do not match, each I/F 116 sends the received cache data to another I/F 116 located at the subsequent position via the ring bus 115.

The cache apparatus 110 adopts a non-blocking cache mechanism so as to hide refill latency as a penalty at the time of a cache miss. This mechanism saves information "ID, tag_id, cache_miss_flag" 135, which is required later, in the waiting queue 140 even when the determination result 125 indicates a cache miss. Then, the cache apparatus 110 executes cache determination processing of the next pixel before completion of processing for reading out cache-missed data from the DRAM 165, and storing it in the cache memory 190. With this processing, the cache apparatus 110 can execute the cache determination for the subsequent pixel even while the cache-missed data is refilled from the DRAM 165 to the cache memory 190. Therefore, a performance degradation at the time of a cache miss can be suppressed.

The cache apparatus 110 can implement a fully-associative cache apparatus, which can be shared by a plurality of processing apparatuses, using a very simple mechanism. When the plurality of processing apparatuses share one cache apparatus 110, addresses having low correlations are successively input to the cache determination unit 120. Since a cache determination unit which adopts a general direct mapping method calculates a storage address of a tag memory used to manage a cache tag from lower bits of each address, a cache conflict is readily caused by such addresses having low correlations. To increase the number of set-associative nodes in correspondence with the number of processing apparatuses is one solution to reduce the cache conflict probability. However, when the number of processing apparatuses becomes very large, a very large number of nodes have to be coped with. Hence, it becomes difficult for a general cache apparatus implementation method to converge timings since the number of logical stages of a selector in a cache determination unit is large, and that cache determination unit cannot be operated at a high operation frequency. By contrast, since the cache determination unit 120 attains determination by the pipeline configuration, it can operate at a very high operation frequency. Also, the cache determination unit 120 does not require any complicated replace control at the time of a cache conflict, which is required in the related art, since data are automatically deleted in turn from older data. For this reason, the cache determination unit 120 and cache memory arbitration unit 180 can be synchronized by a very simple mechanism, and a FIFO can be used as the cache memory. Hence, such arrangement is advantageous to improve the operation frequency of the cache apparatus 110. More importantly, the cache apparatus 110 adopts the fully-associative method, and never causes a cache conflict due to the same lower bits of addresses.

Figure 4:
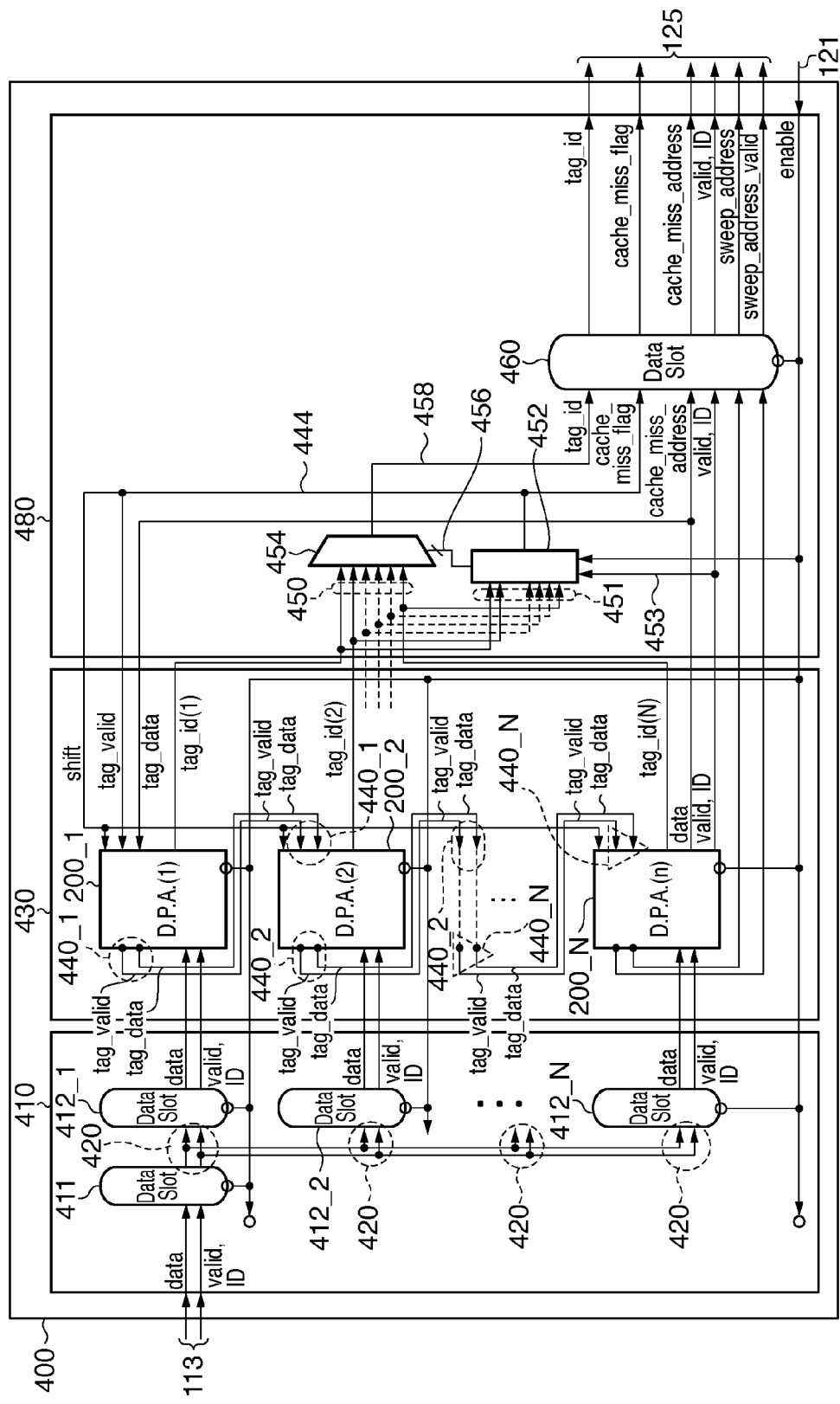
FIG. 4 is an exemplary circuit diagram of a cache determination unit 400.

A cache apparatus using a cache determination unit 400 shown in FIG. 4 will be described. FIG. 4 is a circuit diagram for explaining an example of the circuit arrangement of the cache determination unit 400. The cache determination unit 400 is used in place of the cache determination unit 120 of the cache apparatus 110 shown in FIG. 1. A description of the same parts as in the basic arrangement of the aforementioned cache apparatus 110 will not be repeated. The cache determination unit 400 includes a replicating apparatus 410, operation apparatus 430, and cache determination apparatus 480. The operation apparatus 430 includes a plurality of data processing apparatuses (D.P.A.) 200_1 to 200_N, each of which has the same arrangement as that of the data processing apparatus 200 described using FIG. 2. In this manner, since the cache determination unit 400 includes the plurality of data processing apparatuses described above, the number of data elements which can be compared at the same time is increased. Since the cache determination unit 400 shown in FIG. 4 includes the plurality of basic data processing apparatuses, a data processing apparatus which has already been designed and verified can be re-used, thus improving the development efficiency.

Respective Data Slots included in the cache determination unit 400 are the same as the nodes 310 and 330 shown in FIG. 3, and updates a data element stored so far using a new data element when the signal "enable" 121 is valid (asserted). A node 411 receives the storage address 113 from the I/F 112. As described above, the storage address 113 includes the validity signal "valid", address signal "data", and identification signal "ID". The replicating apparatus 410 replicates the storage address 113 to retime it in nodes 412_1 to 412_N as indicated by 420. The nodes 412_1 to 412_N respectively output stored data elements to the first pipelines 300 of the corresponding data processing apparatuses 200_1 to 200_N. In this way, replicas of the same storage address 113 are input in parallel to the first pipelines 300 of the respective data processing apparatuses at the same timing.

The operation apparatus 430 receives a signal "cache_miss_flag" 444 output from a decoder 452 of the cache determination apparatus 480 as the driving signal "shift", which is input to the respective data processing apparatuses 200_1 to 200_N. Then, data elements of the second pipelines 360 of all the data processing apparatuses 200_1 to 200_N are synchronously shifted. Signals "cache_miss_flag" and "cache_miss_address" output from the cache determination apparatus 480 are input to the second pipeline 360 of the data processing apparatus (1) 200_1 as signals "tag_valid" and "tag_data". Signals "tag_valid" and "tag_data" output from the second pipeline 360 of the data processing apparatus (1) are input to the second pipeline 360 of the data processing apparatus (2) 200_2 as signals "tag_valid" and "tag_data" (440_1). The same applies to the subsequent data processing apparatuses (440_2, 440_N). Signals "tag_valid" and "tag_data" output from the second pipeline 360 of the data processing apparatus (i) are input to the second pipeline 360 of the data processing apparatus (i+1) as signals "tag_valid" and "tag_data". In this manner, in the operation apparatus 430, the data processing apparatuses are sequentially connected so that the outputs "tag_valid, tag_data" of the second pipeline of a certain data processing apparatus are connected in series to the inputs of the second pipeline of the subsequent data processing apparatus.

The cache determination apparatus 480 receives processing results "tag_id(1), tag_id(2), . . . , tag_id(N)" 450 from all the data processing apparatuses 200_1 to 200_N. The cache determination apparatus 480 further receives signals "valid, data" output from the first pipeline 300 of any one of the data processing apparatuses 200_1 to 200_N. The decoder 452 confirms if a validity signal "valid" 453 is valid (asserted) and the signal "enable" 121 is valid. If both the signals are valid, the cache determination apparatus 480 controls the decoder 452 to confirm sign bits 451 of the N processing results "tag_id(1), tag_id(2), . . . , tag id(N)" 450. If the sign bits 451 include at least one "0", the decoder 452 determines a cache hit as a cache determination result, and outputs "0" as the signal "cache_miss_flag" 444. If all the sign bits 451 are "1", the decoder 452 determines a cache miss as a cache determination result, and outputs "1" as the signal "cache_miss_flag" 444. In case of a cache hit, the decoder 452 outputs a number 456 of the data processing apparatus corresponding to "0" of the sign bits to a selector 454. The selector 454 selects "tag_id" of the data processing apparatus indicated by the number 456 from the processing results "tag_id(1), tag_id(2), . . . , tag_id(N)" 450, and outputs it as a signal "tag_id" 458. When the signal "enable" 121 is valid (asserted), a node 460 updates data elements stored so far using the input data elements. Then, the node 460 outputs data elements stored by itself to the access arbitration unit 130 as the determination result 125.

As described above, in the cache apparatus using the cache determination unit 400 shown in FIG. 4, a single address signal "data" is simultaneously compared with a plurality of different address signals "tag_valid" in the respective data processing apparatuses. Then, a fully-associative cache apparatus having a larger number of nodes can be easily implemented. The cache apparatus using the cache determination unit 400 includes a plurality of data processing apparatuses each having the basic arrangement, and can be implemented by connecting only the first pipelines 300 and second pipelines 360 of the respective data processing apparatuses. For this reason, a data processing apparatus which has already been designed and verified can be re-used. As a result, for example, in development which is required to increase/decrease the number of nodes of a fully-associative cache apparatus, the development efficiency can be improved. Also, the cache determination unit 400 executes data processing using the pipeline configuration, and can determine a cache miss by calculating only logical products of all sign bits. In this manner, the cache apparatus can operate at a very higher operation frequency than the conventional cache apparatus.

Note that in case of a cache miss, data elements "tag_data, tag_valid" may be swept out as the outputs of the second pipeline 360 of the data processing apparatus (N) 200_N located at the rearmost position. These swept-out data elements are output to the node 460, which may output the determination result 125 including these data elements as "sweep_address, sweep_address_valid" to the access arbitration unit 130. Using these data elements, a write-back cache apparatus can be implemented.

In the write-back cache apparatus, cache data temporarily stored in the cache memory 190 is replaced by write data written out by the processing apparatuses A 101 to D 104. For this reason, the data temporarily stored in the cache memory 190 has to be saved in the DRAM 165 as an external memory. In order to cope with the write-back cache apparatus and to allow the processing apparatuses A 101 to D 104 to perform write operations, the storage address 113 to be output includes:

a write flag "write_enable"; and
write data "write_data".

When the write flag "write_enable" is valid (asserted), the write data "write_data" is written at a storage address of the cache memory 190. When the write flag "write enable" is invalid (deasserted), the operation of the aforementioned read cache apparatus is performed. Then, the data elements "write_enable" and "write_data" are shifted in the first pipelines 300 of the respective data processing apparatuses 200_1 to 200_N in the cache determination unit 400 in synchronism with other data elements included in the storage address 113. The data processing apparatus (N) 200_N outputs the data elements "write_enable" and "write_data" to the node 460 in synchronism with other data elements. The node 460 outputs the determination result 125 including these data to the access arbitration unit 130. That is, this determination result 125 includes:

an address signal "cache_miss_address" as a data storage address of the DRAM at the time of a cache miss;
an identification signal "ID" of a processing apparatus;
a storage address "tag_id" of cache data;
a cache determination result "cache_miss_flag";
a write flag "write_enable";
write data "write_data";
a swept-out address signal "sweep_address"; and
a swept-out address validity signal "sweep_address_valid".

The determination result 125 arrives the cache memory arbitration unit 180 via the waiting queue 140. The cache memory arbitration unit 180 calculates a storage address of the cache memory 190 using "ID, tag_id" in the same manner as described above. When the cache determination result "cache_miss_flag" is invalid (deasserted), since this means a cache hit, the cache memory arbitration unit 180 writes the write data "write_data" at the storage address of the cache memory 190. On the other hand, when the cache determination result "cache_miss_flag" is valid (asserted), since this means a cache miss, the cache memory arbitration unit 180 cannot immediately write the write data "write_data" in the cache memory 190. When the swept-out address validity signal "sweep_address_valid" is valid (asserted), data temporarily stored at the storage address of the cache memory 190 is overwritten. Hence, the cache memory arbitration unit 180 reads out cache data at the storage address from the cache memory 190, and saves this cache data in an area of the DRAM 165 indicated by the swept-out address signal "sweep_address". After that, the cache memory arbitration unit 180 refills data in an area of the DRAM 165 as an external memory indicated by the address signal "cache_miss_address" in the cache memory 190. At this time, the cache memory arbitration unit 180 overwrites the data read out from the DRAM 165 by the write data "write_data", and temporarily stores the overwritten data at the storage address of the cache memory 190. When the readout data and "write_data" have the same size (the same number of bytes), the cache memory arbitration unit 180 may skip this refill operation. When the swept-out address signal "sweep_address_valid" is invalid (deasserted), valid cache data is not temporarily stored at the storage address of the cache memory 190. Therefore, the cache memory arbitration unit 180 need not save cache data temporarily stored at the storage address of the cache memory 190. In this case, the cache memory arbitration unit 180 may temporarily store the data "write_data" as cache data at the storage address of the cache memory 190 while performing the aforementioned refill operation if necessary.

With the aforementioned arrangement, the write-back cache apparatus can be easily implemented. The cache determination unit 400 of the cache apparatus used as the write-back cache apparatus also has the same advantages as those of the read cache apparatus. Especially, data are automatically deleted in turn from older data, and complicated replace control at the time of a cache conflict need not be executed. Then, cache data temporarily stored in the cache memory need only be saved in turn from older data in the DRAM 165 as an external memory. As described above, write-back control unique to the write-back cache apparatus can be implemented by a very simple method.

Figure 5:
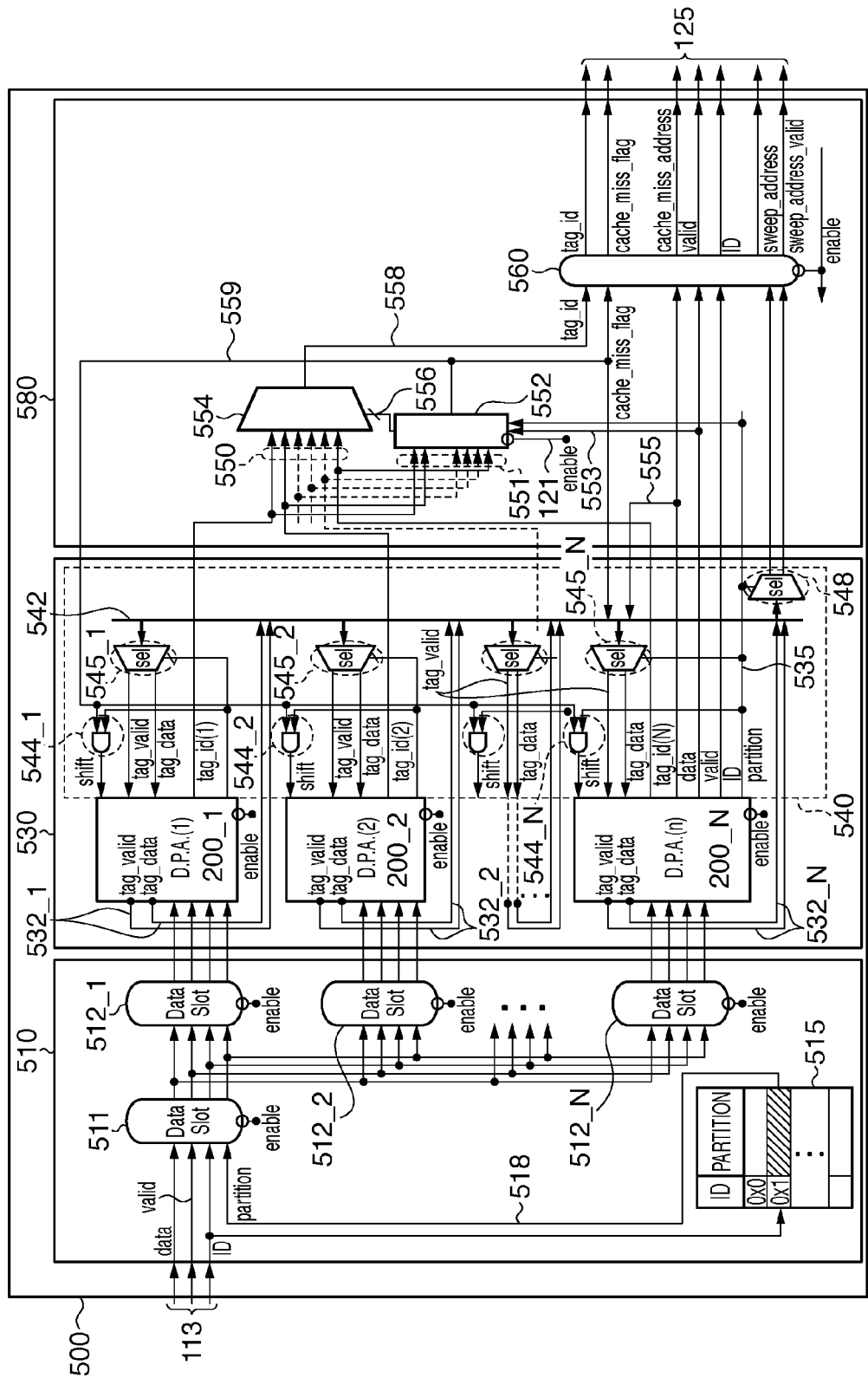
FIG. 5 is an exemplary circuit diagram of a cache determination unit 500.

A cache apparatus using a cache determination unit 500 shown in FIG. 5 will be described below. FIG. 5 is an exemplary circuit diagram for explaining the circuit arrangement of the cache determination unit 500 including a partition information table. The cache determination unit 500 is used in place of the cache determination unit 120 of the cache apparatus 110 shown in FIG. 1.

The cache determination unit 500 includes a replicating apparatus 510, operation apparatus 530, and cache determination apparatus 580. The operation apparatus 530 includes a plurality of data processing apparatuses 200_1 to 200_N, each of which has the same arrangement as that of the data processing apparatus 200 described using FIG. 2. In this way, as in the cache determination unit 400, the cache determination unit 500 includes the plurality of data processing apparatuses described above, thereby increasing the number of data elements which can be compared at the same time.

Furthermore, when the plurality of processing apparatuses A 101 to D 104 share the cache apparatus 110, the cache determination unit 500 can switch a cache capacity (the number of nodes) to be exclusively used by each processing apparatus for respective processing apparatuses. By switching an exclusive assignment for each processing apparatus, a larger cache capacity (the number of nodes) can be assigned to image processing with a high priority level. That is, upon execution of image processing, the exclusive assignment of a cache capacity (the number of nodes) is adaptively switched according to the purpose of image processing, thus executing the image processing with a desired efficiency.

The replicating apparatus 510 shown in FIG. 5 includes a partition information table 515 unlike in the replicating apparatus 410. Therefore, a description of parts common to those in the replicating apparatus 410 will not be given, and the partition information table 515 will be described below. In the partition information table 515, the CPU 160 sets partition information in advance so as to switch assignments of cache capacities (the numbers of nodes) to be exclusively used by respective processing apparatuses. The partition information represents assignments (groups) of the data processing apparatuses 200_1 to 200_N to be exclusively used by the respective processing apparatuses. The partition information table 515 will be described in detail below with reference to FIGS. 7 and 8. The partition information table 515 allows to set partition information 704 for each identification signal ID 702 of the processing apparatus, as in a format 700 shown in FIG. 7. When there are M processing apparatuses, and there are N data processing apparatuses 200 in the operation apparatus 530, N-bit partition information 704 is stored in correspondence with each of the identification signal IDs 702=1 to M. The N-bit partition information 704 serves as a flag, each bit of which indicates whether or not the data processing apparatus 200 indicated by that bit is to be used, in turn from the most significant bit. When each bit is "1", it indicates <use> of the indicated data processing apparatus; when it is "0", it indicates <nonuse>.

Figure 8:
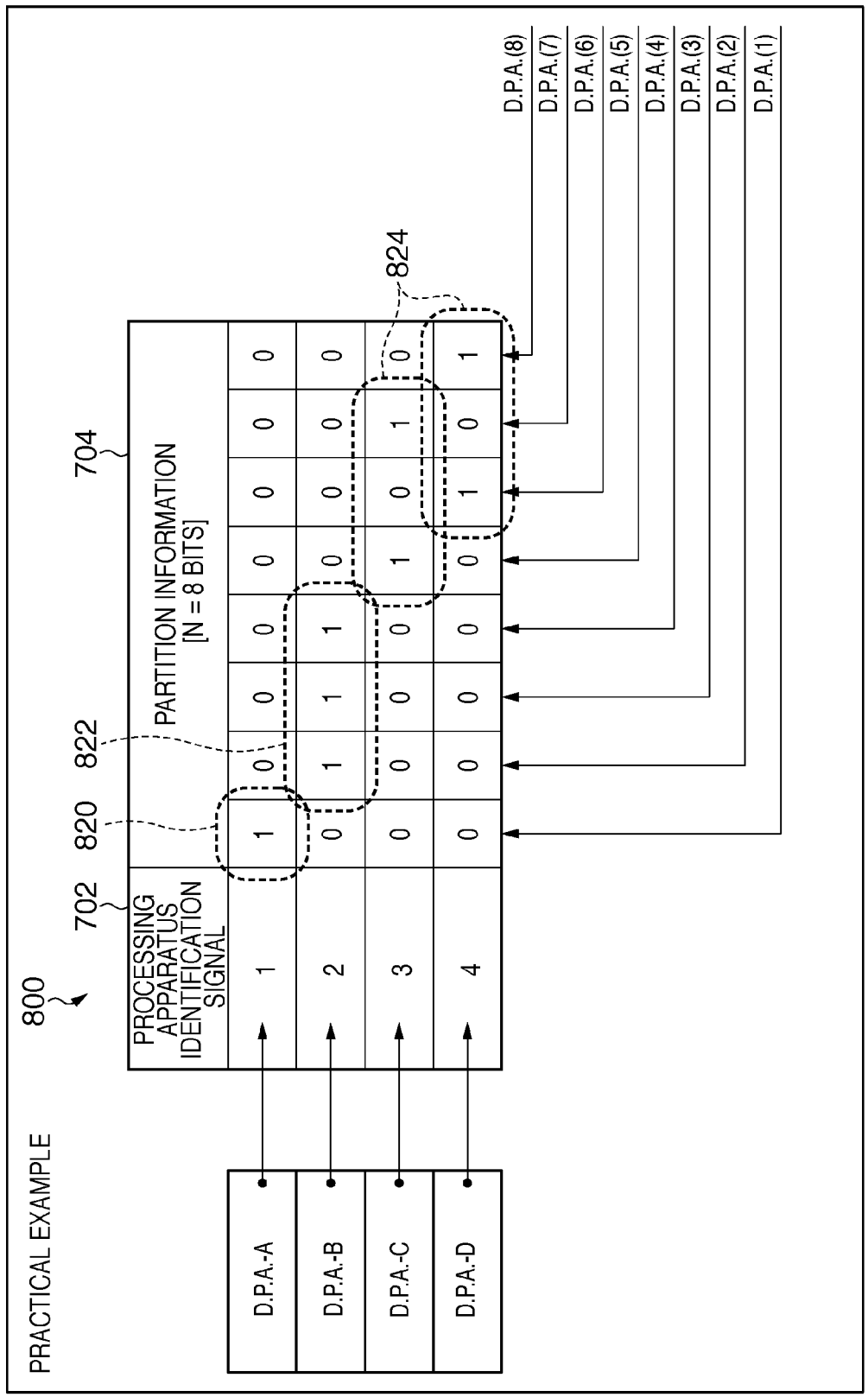
FIG. 8 is an exemplary diagram showing a practical example of the partition information table.

A practical example 800 of the partition information table 515 will be described below with reference to FIG. 8. In the practical example 800, four pieces of 8-bit partition information 704 are stored in correspondence with the four identification signal IDs 702=1 to 4. These four identification signal IDs 702 are respectively associated with the four processing apparatuses A 101 to D 104 shown in FIG. 1. Then, each individual bit of the 8-bit partition information 704 is associated with each of the data processing apparatuses (1) 200_1 to (N) 200_N shown in FIG. 5 in turn from the most significant bit. For example, the partition information of the processing apparatus A 101 is "10000000", and has a setting indicating that the processing apparatus A 101 uses the data processing apparatus (1) (shown at 820) but it does not use the remaining data processing apparatuses (2) to (8). The partition information of the processing apparatus B 102 is "01110000", and has a setting indicating that the processing apparatus B 102 uses the data processing apparatuses (2) to (4) (shown at 822), but it does not use the remaining data processing apparatuses (1) and (5) to (8). Likewise, a setting of the processing apparatus C 103 indicates that it uses the data processing apparatuses (5) and (7), but it does not use the remaining data processing apparatuses. A setting of the processing apparatus D 104 indicates that it uses the data processing apparatuses (6) and (8), but it does not use the remaining data processing apparatuses. In this practical example 800, the processing apparatus A 101 exclusively uses the data processing apparatus (1), the processing apparatus B 102 exclusively uses the data processing apparatuses (2) to (4), the processing apparatus C 103 exclusively uses the data processing apparatuses (5) and (7), and the processing apparatus D 104 exclusively uses the data processing apparatuses (6) and (8). The settings of the pieces of partition information 704 need only be exclusive among the plurality of processing apparatuses, and the data processing apparatuses may be discontinuously assigned like in the settings of the processing apparatuses C 103 and D 104 (shown at 824).

Referring back to FIG. 5, the replicating apparatus 510 reads out, using an input identification signal "ID", partition information "partition" 518 corresponding to this identification signal "ID" from the partition information table 515, and inputs the readout information to a node 511. The node 511 replicates an input validity signal "valid" and input data signals "data, ID, partition", and outputs them to nodes 512_1 to 512_N. The nodes 512_1 to 512_N respectively output data elements stored by themselves to the first pipelines 300 of the corresponding data processing apparatuses 200_1 to 200_N. In this manner, the replicating apparatus 510 replicates data elements as many as the number of data processing apparatuses 200 to retime them.

[Connection Switching of Second Pipelines 360]

In the operation apparatus 530, the second pipelines 360 of the respective data processing apparatuses are connected, as indicated by a broken line part 540. The connections of the second pipelines 360 are automatically switched according to partition information "partition" 535 output from the data processing apparatus (N) 200_N. The operation apparatus 530 respectively calculates logical products of a signal "cache_miss_flag" 559 output from a decoder 552 and respective bits corresponding to the data processing apparatuses (1) to (N) of the partition information "partition" 535 output from the data processing apparatus (N). Then, the operation apparatus 530 inputs the calculated logical products as driving signals "shift" of the corresponding data processing apparatuses (544_1, 544_2, . . . , 544_N). As a result, data elements of the second pipelines 360 of only the data processing apparatuses corresponding to <use> in the partition information of all the data processing apparatuses are synchronously shifted.

Next, the operation apparatus 530 compiles data elements required to switch the connections of the second pipelines 360. Data elements 532_1 to 532_N, "cache_miss_flag" 559, and "cache_miss_address(data)" 555 output from the second pipelines 360 of the respective data processing apparatuses (1) to (N) are bundled on a bus 542. Then, data are input from the bus 542 to selectors 545_1, 545_2, . . . , 545_N used to select inputs to the second pipelines 360 of the data processing apparatuses (1) to (N). The selectors 545_1, 545_2, . . . , 545_N select corresponding data elements based on the partition information "partition" 535, and inputs the selected data elements to the second pipelines 360 of the data processing apparatuses (1) to (N). Also, a selector 548 used to output data elements which are swept out at the time of a cache miss may be added. Swept-out data elements are selected from the bus 542 based on the partition information "partition" 535, and are output as data elements "sweep_address, sweep_address_valid". As described above, these data elements are used when the cache apparatus 110 is used as the write-back cache apparatus.

For example, the input selection method to the second pipelines in the practical example 800 is as follows. When an identification number "ID" output from the first pipeline 300 of the data processing apparatus (N) is "1", the partition information includes the setting "10000000", as can be seen from the practical example 800. When a cache determination result associated with data elements whose "ID"="1" is a cache miss, the second pipeline 360 of the data processing apparatus (1) is shifted. Hence, as inputs to the second pipeline of the data processing apparatus (1), data "cache_miss_flag" 559 and "cache_miss_address(data)" 555 are selected from those on the bus 542. As swept-out data elements "sweep_address, sweep_address_valid", the data element 532_1 from the second pipeline 360 of the data processing apparatus (1) are selected. On the other hand, when an identification number "ID" output from the first pipeline 300 of the data processing apparatus (N) is "2", the partition information includes the setting "01110000", as can be seen from the practical example 800. When a cache determination result associated with data elements whose "ID"="2" is a cache miss, the second pipelines of the data processing apparatuses (2) to (4) are shifted. Hence, as inputs to the second pipeline 360 of the data processing apparatus (2), data "cache_miss_flag" 559 and "cache_miss_address(data)" 555 are selected from those on the bus 542. As inputs to the second pipeline of the data processing apparatus (3), the outputs 532_2 from the second pipeline of the data processing apparatus (2) are selected. As inputs to the second pipeline of the data processing apparatus (4), the outputs from the second pipeline of the data processing apparatus (3) are selected. Also, as swept-out data elements "sweep_address, sweep_address_valid", the outputs from the second pipeline of the data processing apparatus (4) are selected. The same applies to switching of the connections of the second pipelines associated with data elements with "ID"="3" and "4". Even when the partition information includes discontinuous settings like in a part 824 of the practical example 800, the second pipelines are connected in turn in ascending order of apparatus number of the data processing apparatuses. That is, the outputs from the second pipeline of the data processing apparatus to be used need only be connected in series with the inputs of the second pipeline of the next data processing apparatus to be used according to the setting of the partition information "partition" 535.

Figure 6:
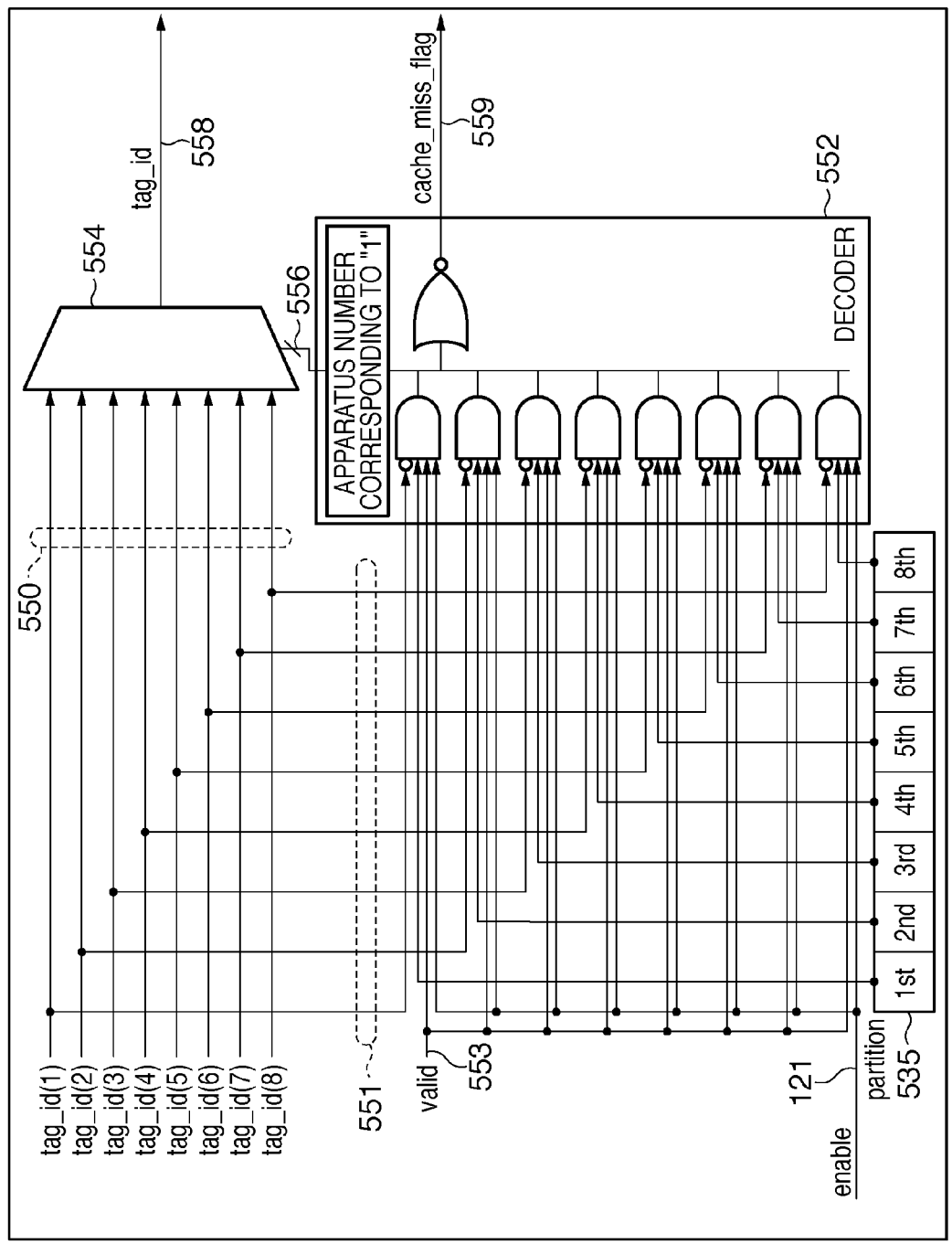
FIG. 6 is an exemplary circuit diagram for explaining a decoder 552 in detail.

The cache determination apparatus 580 receives processing results "tag_id(1), tag_id(2), . . . , tag_id(N)" 550 of all the data processing apparatuses 200_1 to 200_N. The cache determination apparatus 580 receives signals "valid, data, ID, partition" from any one of the data processing apparatuses 200_1 to 200_N. In FIG. 5, these signals are input from the data processing apparatus (N) 200_N, but they may be input from another data processing apparatus. The decoder 552 receives the partition information "partition" 535 unlike the decoder 452. The decoder 552 will be described in detail below with reference to FIG. 6. The decoder 552 calculates logical products of the following four signals (1-bit signals):
 a validity signal "valid" 553;
 a signal obtained by inverting a sign bit of the processing result "tag_id" of one of the data processing apparatuses (1) to (N) (inverting arbitrary 1 bit of sign bits 551);
 a 1-bit signal corresponding to one of the data processing apparatuses (1) to (N) of the partition information "partition" 535; and
 the driving signal "enable" 121.

When at least one of the logical products is "1", the decoder 552 determines a cache hit as a cache determination result; when all the logical products are "0", it determines a cache miss as a cache determination result. When all the logical products are "0", the decoder 552 validates (asserts) the signal "cache_miss_flag" 559 and outputs that signal. In case of a cache hit, the decoder 552 outputs an apparatus number (any of 1 to N) 556 of the data processing apparatus corresponding to the logical product="1" to a selector 554. The cache determination apparatus 580 selects a processing result "tag_id" 558 at the time of a cache hit from the plurality of processing results "tag_id(1) to tag_id(N)" 550 based on the cache hit apparatus number 556 using the selector 554, and outputs it to a node 560.

Figure 9:
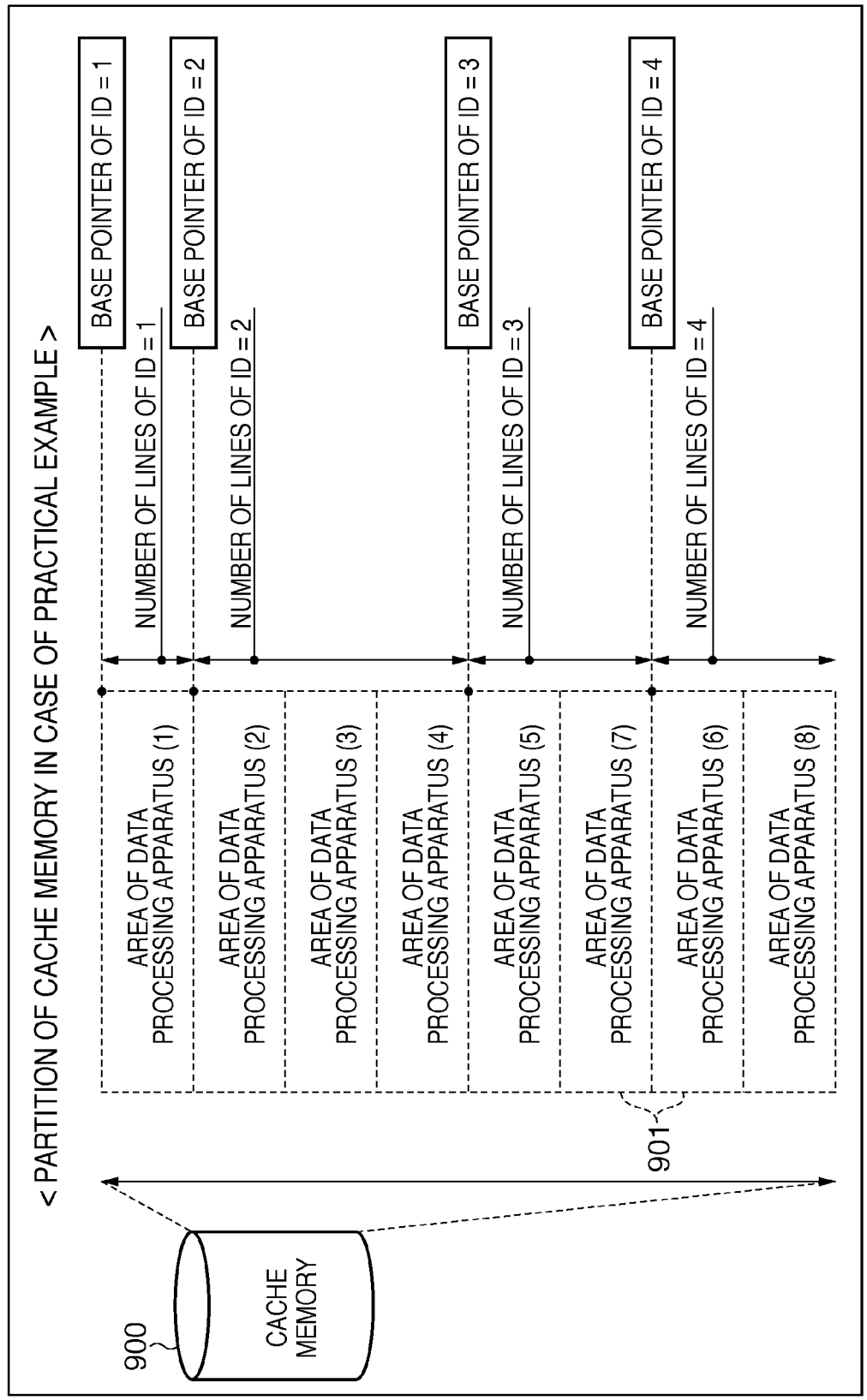
FIG. 9 is an exemplary view for explaining a cache memory 900.

The operation of the cache memory arbitration unit 180 of the cache apparatus using the cache determination unit 500 and the arrangement of a cache memory 900 will be described below. The cache memory 900 shown in FIG. 9 will be described first. The cache memory 900 is used in place of the cache memory 190 shown in FIG. 1. The cache memory 900 is also configured by a FIFO. The cache memory 900 is divided into areas corresponding to the data processing apparatuses (1) to (N). According to the setting of the partition information, a base pointer as a reference of the FIFO and the number of lines of each area are determined for each ID. Even when areas are discontinuous like in the part 824 of the practical example 800, areas to be used are continuously assured by the function of the aforementioned second pipeline connection switching device. This means that areas corresponding to the data processing apparatuses (6) and (7) are assured on the cache memory 900 while being replaced, as denoted by reference numeral 901. Then, even when "ID"="3" and "4", data accesses to the cache memory 900 can be attained by simple FIFO control as in a case of "ID"="1" and "2". The cache memory arbitration unit 180 acquires the aforementioned base pointer and the number of lines according to the readout "ID" and a write pointer for each ID. When a cache hit is determined, the cache memory arbitration unit 180 calculates an address based on the result "tag_id", which is read out at the same time, and the base pointer and write pointer of the cache memory 900. Then, the cache memory arbitration unit 180 writes readout cache data in a storage area indicated by the total value of the base pointer and write pointer of the cache memory 900 as data "write_data" 182.

As described above, the cache determination unit 500 executes data processing using the pipeline configuration. By calculating at most 1-bit logical products of inverted sign bits of outputs corresponding to the respective data processing apparatuses and partition information, a cache hit can be determined. As a result, the cache apparatus can operate at a very high operation frequency compared to the conventional cache apparatus. Since data are automatically deleted in turn from older data, complicated replace control at the time of a cache conflict is not required. Also, the cache memory requires only ring type FIFO operations for predetermined areas. In order to implement the cache memory 900, a multi-bank FIFO having a plurality of write pointers need only be used. Also, the cache memory 900 can be implemented using a plurality of FIFOs. In the example of the above description, the partition information table is prepared, and the partition information is switched for each processing apparatus. However, the above processing can be implemented when each processing apparatus designates partition information for respective processing contents (operation statuses) of the processing apparatus.

The respective nodes of the first pipelines 300 and second pipelines 360 of the plurality of data processing apparatuses (1) to (N) described in FIG. 5 operate based on clock signals of one system (not shown). However, the plurality of data processing apparatuses (1) to (N) may be operated by respectively inputting in-phase clocks signals of different systems to the data processing apparatuses (1) to (N). Upon prioritizing power savings, clock signals to one of the data processing apparatuses (1) to (N) are stopped to stop that data processing apparatus. For example, in the aforementioned practical example 800, when only the processing apparatus A 101 is operated, and the processing apparatuses B 102 to D 104 are stopped, information "00000000" is set in pieces of partition information corresponding to "ID"="2" to "4" in the partition information table 515. Then, the data processing apparatuses other than the data processing apparatus (1) are stopped. On the other hand, in order to operate the processing apparatuses A 101 to D 104 although at low speed while prioritizing power savings, information "10000000" is set in pieces of partition information corresponding to "ID"="1" to "4". With this setting, the data processing apparatus (1) is shared by all the processing apparatuses A 101 to D 104. Since the remaining data processing apparatuses are not used, they can be stopped. Also, the cache memory 900 is implemented using different SRAMs for respective areas of the data processing apparatuses (1) to (N). In correspondence with the stopped data processing apparatuses, supplies of clock signals (or power supply voltages) to the SRAMs which are not used are stopped. In this way, further power savings can be attained.

Figure 10:
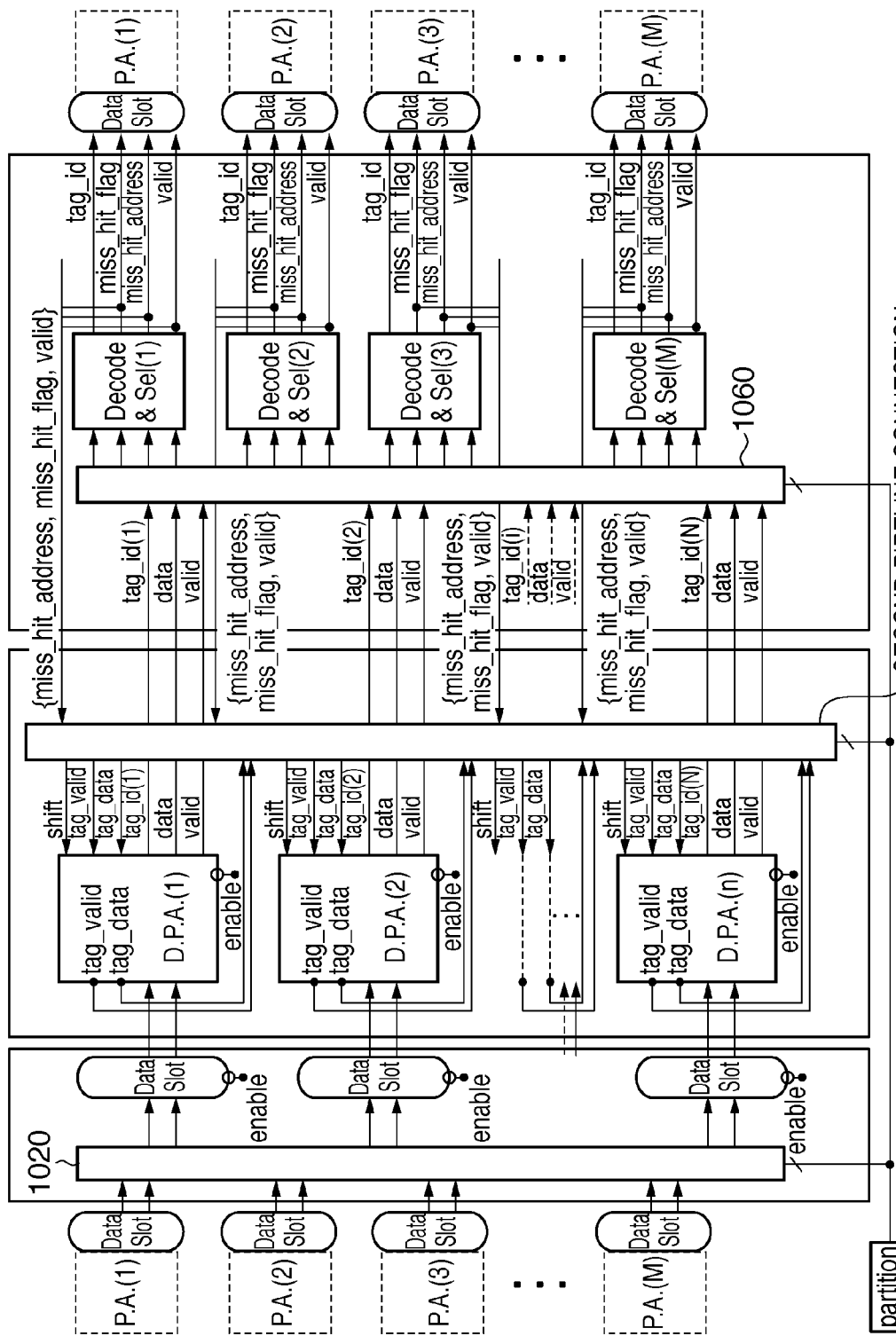
FIG. 10 is an exemplary circuit diagram when crossbar switches are used.
Figure 11:
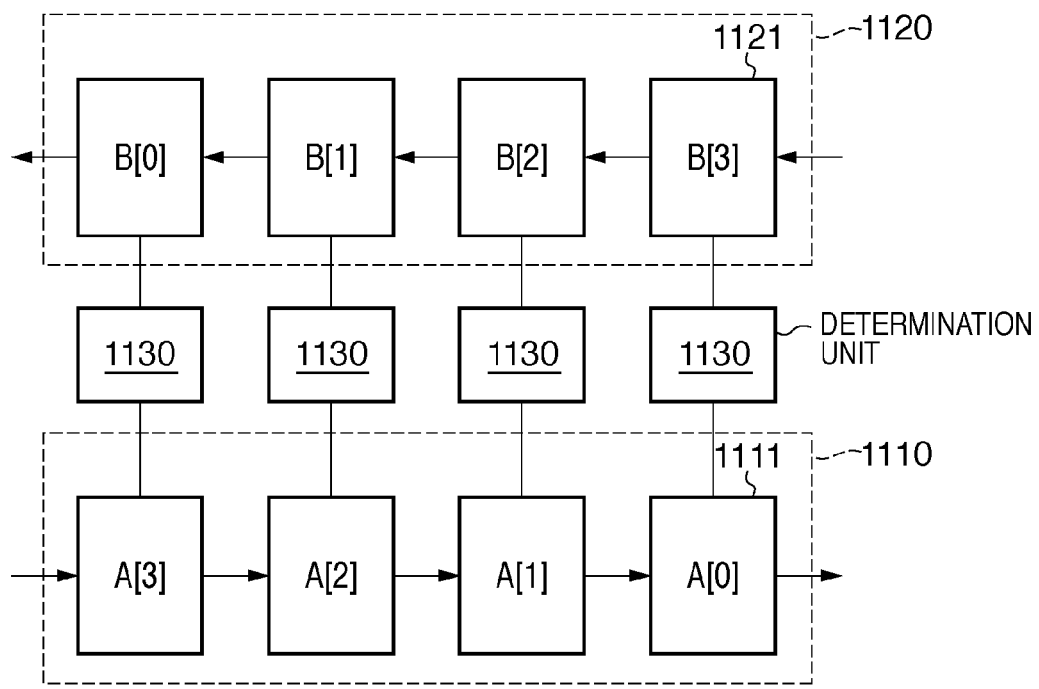
FIG. 11 is a block diagram for explaining the conventional counterflow pipeline technique.

FIG. 10 is an exemplary circuit diagram for explaining the arrangement in which crossbar switches are used in place of the ring buses. FIG. 10 shows an example of connections between M processing apparatuses (1) to (M) and N data processing apparatuses (1) to (N), which connections are attained via crossbar switches 1020 and 1060 in place of the aforementioned connections via the ring buses. In order to allow the plurality of processing apparatuses to exclusively use each of the data processing apparatuses, the crossbar switches 1020 and 1060, which are switched based on partition information "partition", are inserted before and after the data processing apparatuses. With this arrangement, the plurality of processing apparatuses can use the plurality of data processing apparatuses in parallel. With such parallel processes, the plurality of processing apparatuses can be speeded up.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-130447, filed Jun. 7, 2010, which is hereby incorporated by reference herein in its entirety.

What is claimed is:

1. An operation apparatus comprising:
a plurality of first holding units each of which includes a plurality of first nodes connected in series, wherein first data held in each first node is shifted to a neighboring node located in a first direction;
a plurality of second holding units each of which includes a plurality of second nodes connected in series, wherein second data held in each second node is shifted to a neighboring node located in a second direction,
wherein each first node corresponds to at least one of the plurality of second nodes, and
wherein the plurality of second holding units is connected in series such that second data held in a second node located at a most downstream side of a second holding unit is moved to a second node located at a most upstream side of another second holding unit;
an operation unit which executes, for a node of interest which is one of the plurality of the first nodes of the first holding unit, an operation using first data held in the node of interest and second data held in at least one of the plurality of second nodes to which the node of interest corresponds; and
an input unit which inputs, in parallel, replicated first data and original first data to at least two out of the plurality of first holding units and inputs the second data to one of the plurality of second holding units, wherein the inputted second data is moved through the plurality of second holding units,
wherein at least two of identical first data are used for respective operations executed by the operation unit along with the different second data held in the plurality of second holding units.

2. A determination apparatus comprising:
an operation apparatus that includes:
a plurality of first holding units each of which includes a plurality of first nodes connected in series, wherein each first holding unit is a first pipeline which includes a plurality of first nodes, wherein first data held in one first node is shifted to another first node located in a first direction with respect to the one first node;
a plurality of second holding units each of which includes a plurality of second nodes connected in series, wherein each second holding unit is a second pipeline which includes a plurality of second nodes, wherein second data held in one second node is shifted to another second node located in a second direction opposite to the first direction with respect to the one second node,
wherein each first node corresponds to at least one of the plurality of second nodes, and
wherein the plurality of second holding units is connected in series such that second data held in a second node located at a most downstream side of a second holding unit is moved to a second node located at a most upstream side of another second holding unit;
an operation unit includes a comparison unit which compares, for a node of interest which is one of the plurality of the first nodes of the first pipeline, whether or not first data held in the node of interest matches second data held in at least one of the plurality of second nodes to which the node of interest corresponds; and
an input unit which inputs, in parallel, replicated first data and original first data to at least two out of the plurality of first holding units and inputs the second data to one of the plurality of second holding units, wherein the inputted second data is moved through the plurality of second holding units,
wherein at least two of identical first data are compared with different second data held in the plurality of second holding units.

3. The apparatus according to claim 1, further comprising:
an acquisition unit which acquires the first data and the second data from an external apparatus;
a first input unit which replicates the acquired first data and inputs the replicated first data and original first data to each of the plurality of the first holding units; and a second input unit which inputs the acquired second data to one of the plurality of the second holding units.

4. The apparatus according to claim 1, further comprising:
a plurality of operation circuits each of which includes one first holding unit and one second holding unit,
wherein the plurality of operation circuits are grouped into a plurality of groups,
wherein the input unit inputs the second data to the second holding unit of one operation circuit in the group for each group, and
wherein the second holding units are connected in series for each group.

5. The apparatus according to claim 4, wherein the input unit changes the groups dynamically.

6. A cache apparatus comprising:
a plurality of data processing apparatuses,
wherein each of the plurality of data processing apparatuses includes:
a first pipeline which includes a plurality of first nodes, wherein an address held in one first node is shifted to another first node located in a first direction with respect to the one first node;
a second pipeline which includes a plurality of second nodes, wherein a cache tag held in one second node is shifted to another second node located in a second direction opposite to the first direction with respect to the one second node, and
wherein each first node corresponds to at least one of the plurality of second nodes; and
a comparison unit which compares, for a node of interest which is one of the plurality of the first nodes of the first pipeline, an address held in the node of interest with a plurality of cache tags held in at least two of second nodes to which the node of interest corresponds to determine whether or not the address matches the cache tag;
a cache memory which stores some of data stored in an external storage device;
an acquisition unit which acquires a request of data from a processing apparatus;
a first input unit which replicates an address of the acquired data and inputs the replicated address and original address to the first pipelines of the plurality of data processing apparatuses;
a second input unit which inputs a cache tag of data stored in the cache memory to the second pipeline of one of the plurality of data processing apparatuses; and
a determination unit which determines, when it is determined that a comparison result of the comparison unit indicates a match, a cache hit of the acquired data,
wherein the second pipelines of the plurality of data processing apparatuses are connected in series such that a cache tag held in a second node located at a most downstream side of a second pipeline is moved to a second node located at a most upstream side of another second pipeline and the cache tag is moved through the second pipelines,
wherein at least two of identical addresses are compared with different cache tags held in the second pipelines of the plurality of data processing apparatuses.

7. The cache apparatus according to claim 6,
wherein the plurality of data processing apparatuses are grouped into a plurality of groups,
wherein the second input unit inputs the cache tag to the second pipeline of one data processing apparatus in the group for each group, and
wherein the second pipelines of the plurality of data processing apparatuses are connected in series for each group.

8. The cache apparatus according to claim 7, further comprising a unit which dynamically changes the groups.

9. The cache apparatus according to claim 7,
wherein the cache memory is divided into areas respectively corresponding to the plurality of data processing apparatuses, and
wherein the area of the cache memory corresponding to the data processing apparatus which is not used for comparing the address with the plurality of cache tags is deactivated.

10. The cache apparatus according to claim 6,
wherein, when a driving signal is valid, the first pipeline shifts an address held in each of the plurality of first nodes to the neighboring first node located on the downstream side in the first direction, and
wherein, when the driving signal is valid and the determination unit determines a cache miss, the second pipeline shifts a cache tag held in each of the plurality of second nodes to the neighboring second node located on the downstream side in the second direction.

11. The cache apparatus according to claim 6, wherein when the determination unit determines a cache miss, the second input unit inputs an address output from the first pipeline to the second pipeline as a cache tag.

12. The cache apparatus according to claim 6,
wherein the request of data from the processing apparatus is a write request of data to the external storage device, and
wherein the cache apparatus further comprises a unit which writes data corresponding to the write request in the cache memory using a cache tag output from the second pipeline.

13. A control method of an operation apparatus comprising:
shifting first data held in each first node of a plurality of first nodes connected in series in a plurality of first holding units to a neighboring node located in a first direction;
shifting second data held in each second node of a plurality of second nodes connected in series in a plurality of second holding units to a neighboring node located in a second direction,
wherein each first node corresponds to at least one of the plurality of second nodes, and
wherein the plurality of second holding units is connected in series such that second data held in a second node located at a most downstream side of a second holding unit is moved to a second node located at a most upstream side of another second holding unit,
executing, for a node of interest which is one of the plurality of the first nodes of the first holding unit, an operation using first data held in the node of interest and second data held in at least one of the plurality of second nodes to which the node of interest corresponds; and
inputting, in parallel, replicated first data and original first data to at least two out of the plurality of first holding units and inputting the second data to one of the plurality of second holding units, wherein the inputted second data is moved through the plurality of second holding units,
wherein at least two of identical first data are used for respective operations executed by the operation unit along with the different second data held in the plurality of second holding units.

14. A control method of a cache apparatus comprising:
shifting an address held in one first node of a plurality of first nodes in a first pipeline to another first node located in a first direction with respect to the one first node;
shifting a cache tag held in one second node of a plurality of second nodes in a second pipeline to another second node located in a second direction opposite to the first direction with respect to the one second node;
wherein each first node corresponds to at least one of the plurality of second nodes, comparing, for a node of interest which is one of the plurality of the first nodes of the first pipeline, an address held in the node of interest with a plurality of cache tags held in at least two of second nodes to which the node of interest corresponds to determine whether or not the address matches the cache tag;
storing, in a cache memory, some of data stored in an external storage device;
controlling an acquisition unit to acquire a request of data from a processing apparatus;
controlling a first input unit to replicate an address of the acquired data and to input the replicated address and original address to the first pipelines of the plurality of data processing apparatuses;
controlling a second input unit to input a cache tag of data stored in the cache memory to the second pipeline of one of the plurality of data processing apparatuses; and
controlling a determination unit to determine, when it is determined that a comparison result of the comparison unit indicates a match, a cache hit of the acquired data,
wherein the second pipelines of the plurality of data processing apparatuses are connected in series such that a cache tag held in a second node located at a most downstream side of a second pipeline is moved to a second node located at a most upstream side of another second pipeline and the cache tag is moved through the second pipelines,
wherein at least two of identical address are compared with different cache tags held in the second pipelines of the plurality of data processing apparatuses.

15. The apparatus according to claim 1, further comprising:
a decoding unit which decodes a result of an operation using first data held in a first holding unit and second data held in a second holding unit and a result of an operation using first data held in another first holding unit and second data held in another second holding unit.

16. The apparatus according to claim 1, wherein the replicated first data and original first data are concurrently used for respective operations executed by the operation unit along with second data inputted by the input unit at different timings.

* * * * *